Dec. 8, 1970   R. A. CRESSWELL   3,545,210
GAS TURBINE POWER PLANT
Filed Aug. 21, 1968   2 Sheets-Sheet 1
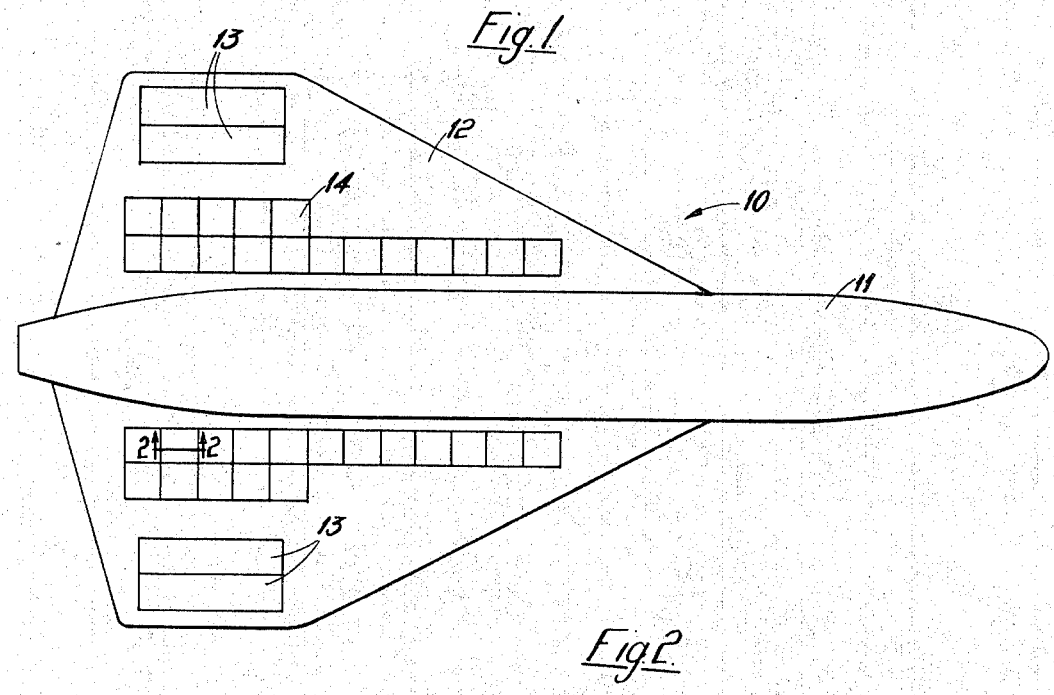
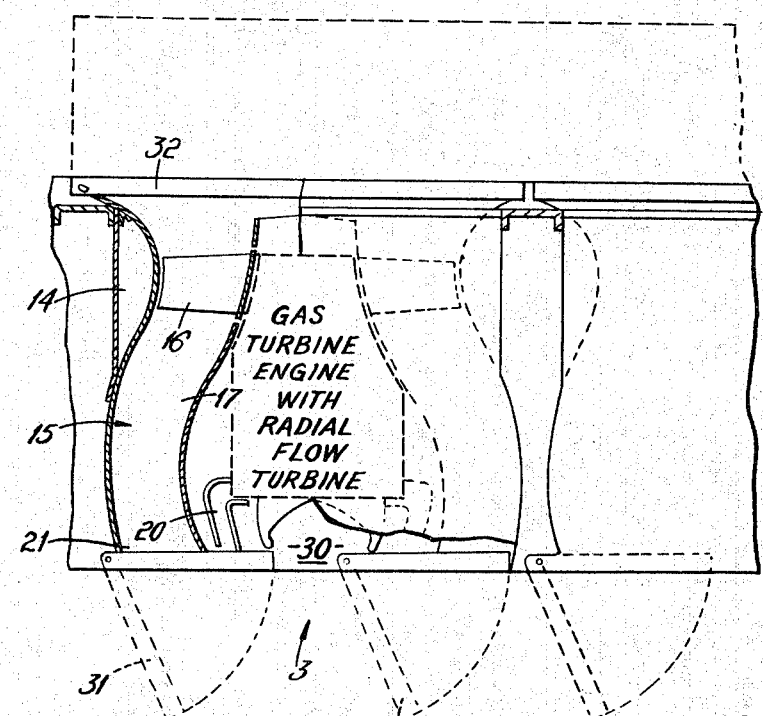
Inventor
ROGER ANTHONY CRESSWELL
By Cushman, Darby & Cushman
Attorneys Inventor
ROGER ANTHONY CRESSWELL By Cushman, Darby & Cushman
Attorneys ent Office 3,545,210
Patented Dec. 8, 1970

3,545,210
GAS TURBINE POWER PLANT
Roger Anthony Cresswell, Derby, England, assignor to Rolls-Royce Limited, Derby, Derbyshire, England, a British company
Filed Aug. 21, 1968, Ser. No. 754,201
Claims priority, application Great Britain, Sept. 1, 1967, 40,136/67
Int. Cl. F02k 3/04; B64c 15/06, 29/00
U.S. Cl. 60—226                                          8 Claims

ABSTRACT OF THE DISCLOSURE

A gas turbine power plant for an aircraft comprises an engine housing within which is vertically mounted one or more gas turbine engines. Each engine has several separate nozzles which have a space between them and which are arranged at the lower end of the housing so that ambient air flows directly to the space whereby base drag is reduced.

---

This invention concerns a gas turbine power plant.

According to the present invention there is provided a gas turbine power plant comprising an enging housing, the lower end of which is rectangular in section, a gas turbine engine vertically mounted within the housing, the engine having a nozzle assembly comprising a plurality of elongated groups of adjacent nozzles disposed along opposite sides of the lower end and which extend to each corner of the latter, the said groups leaving a transversely extending space therebetween through which ambient air may flow directly whereby base drag is reduced.

The engine is preferably a by-pass engine. Thus the engine may either have separate nozzles for a flow of by-pass air and a flow turbine exhaust gases, or these flows may be mixed before issuing to atmosphere and may pass thereto through common nozzles. The by-pass ratio of the engine may be at least 5:1 and is preferably at least 10:1.

The flow of by-pass air may be produced by a fan, e.g. an axial flow fan driven by a radial flow turbine.

At least one, and preferably all, of the said nozzles may be provided with thrust deflector means (e.g. a door, vanes, or louvres) which are movable into and out of a first position in which the respective nozzle is sealed, and into and out of a second position in which the flow through the respective nozzle is deflected horizontally.

The invention also comprises an aircraft provided with at least one power plant as set forth above. Thus the aircraft may be provided on opposite sides of its fuselage with a plurality of power plants provided with the said thrust deflector doors, the thrust deflector means of each said plurality of power plants being ganged together.

Figure 3:
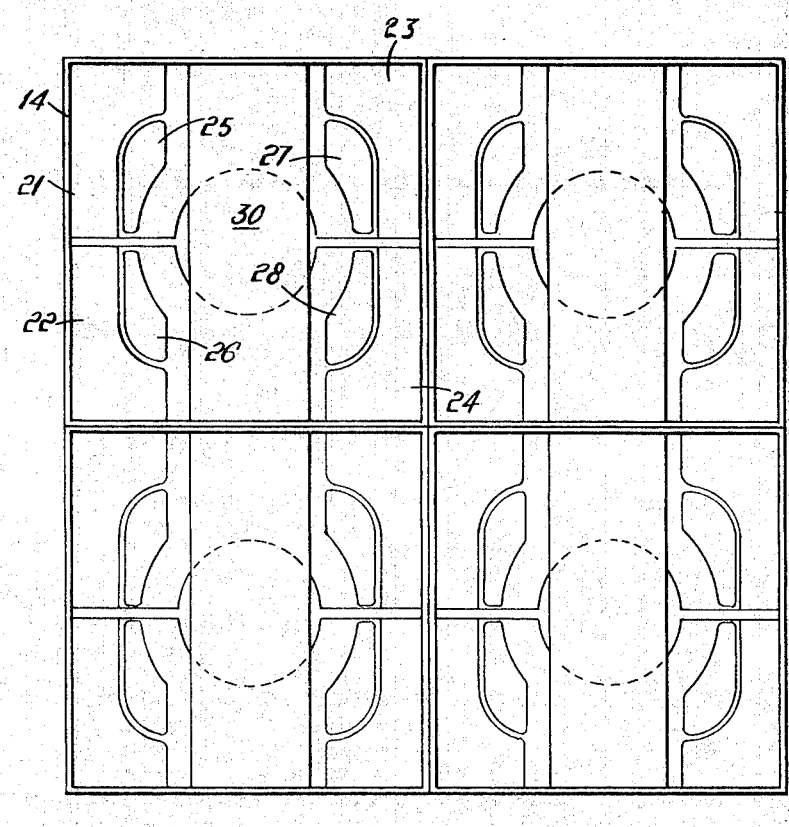
Figure 4:
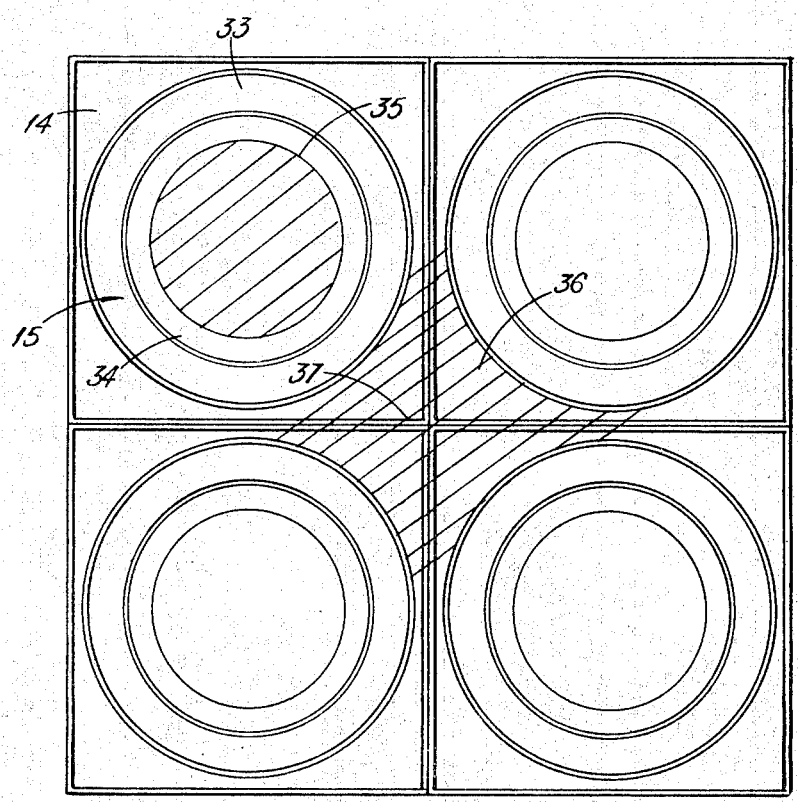

The invention is illustrated, merely by way of example, in the accompanying drawings, in which:

FIG. 1 is a plan view of an aircraft provided with power plant in accordance with the present invention, FIG. 2 is a broken-away sectional elevation taken on the line 2—2 of FIG. 1, the view illustrating the gas turbine engine with a radial flow turbine diagrammatically by broken lines, FIG. 3 is an underneath plan view looking in the direction of the arrow 3 of FIG. 2, parts being omitted for the purpose of clarity, and FIG. 4 is an underneath plan view of a power plant which is not in accordance with the present invention, FIG. 4 being included to illustrate the principles underlying the present invention.

In FIG. 1 there is shown a delta-wing aircraft 10 which is adapted for vertical take-off and landing and which has a fuselage 11 and a wing 12.

Mounted in the wing 12 are two pairs of forward propulsion gas turbine engines 13, the said pairs being disposed on opposite sides of the fuselage 11. There are also mounted in the wing 12, so as to form part of the structure thereof, a number of vertically extending engine housings 14 which are rectangular in section throughout their height and in each of which there is vertically mounted a vertical lift gas turbine by-pass engine 15 (see FIG. 2), which may have a thrust to weight ratio of at least 12:1 and preferably of at least 16:1. The term "vertical lift engine" as used in this specification is intended to mean an engine adapted to produce vertical lift forces on an aircraft independently of those generated aerodynamically by forward flight of the aircraft.

Each of the engines 15 has a very high by-pass ratio, e.g. of 12:1. Each of the engines 15, moreover, has a radial flow turbine which drives an axial flow fan 16, the fan 16 being disposed in and causing a flow of air through, an annular by-pass passage 17 which annularly surrounds the gas generating portion of the engine. The turbine exhaust gases are thus directed to atmosphere through an annular outlet passage 20 which is surrounded by and concentric with the by-pass passage 17.

The by-pass, or fan, air is exhausted from the by-pass passage 17 through four nozzles 21, 22, 23, 24, (FIG. 3) which are disposed at the lower end of the housing 14. The turbine exhaust gases are exhausted from the passage 20 through four nozzles 25, 26, 27, 28 which are disposed at the lower end of the housing 14. The nozzles 21 to 28 are arranged in the form of two elongated groups of nozzles which are respectively disposed along opposite sides of the lower end of the housing 14, the said groups of nozzles extending to each corner of the said lower end. The said groups of nozzles are so arranged as to leave a transversely extending space 30 therebetween through which ambient air can flow directly.

Thus ambient air may flow directly to all parts of the lower end of the housing 14 which are not occupied by the nozzles 21 to 28. If, on the other hand, ambient air were not able to flow directly in this particular way, base drag would be created.

Each of the said groups of nozzles is provided with a lightweight thrust deflecting door 31, each door 31 being progressively movable between two extreme positions. In one of said positions, which is that adopted during cruise and which is shown in full lines in FIG. 2, each door 31 seals off its respective group of nozzles. In the other position, which is shown in dotted lines in FIG. 2, each door 31 effects some horizontal forward deflection of the flow through the said group of nozzles whereby to give a reverser thrust effect. If desired, the doors may be maintained in any position between the said two extreme positions.

If desired, all the doors 31 on the port side of the aircraft, and all the doors 31 on the starboard side of the aircraft may be ganged together, to permit differential port and starboard deflection and thereby to effect yaw control.

Doors 32 are provided at the upper ends of the housings 14 to seal the latter when the engines 15 are not in use.

FIG. 4 has been included to illustrate the advantages of the present invention. FIG. 4, which is an underneath plan view, shows housings 14 each of which has an engine 15 which is provided with two concentric nozzles 33, 34 for by-pass air and turbine exhaust gases respectively, the nozzle 33 being circular in shape and extending substantially to each of the four sides of the housing 14. In the construction of FIG. 4, it will be appreciated, that there is an area 35, which is disposed centrally of each of the turbine exhaust gas nozzles 34, into which the ambient air cannot flow directly. In the construction of FIG. 4, moreover, there is an area 36, adjacent a corner 37 of each housing 14, into which ambient air cannot flow directly.

These areas 35, 36 are therefore areas of negative pressure which will be filled with air travelling up from below. The presence of the areas 35, 36 thus causes base drag. In the construction shown in FIG. 3 on the other hand, there are no areas corresponding to the areas 35, 36 since the parts of each housing 14 which are not occupied by the nozzles 21 to 28 are constituted by the transversely extending spaces 30 through which the ambient air may flow directly.

I claim:

1. A gas turbine power plant comprising an engine housing having a lower end which is rectangular in section, a gas turbine engine vertically mounted within said housing, said engine having a nozzle assembly comprising a plurality of elongated groups of adjacent nozzles disposed along opposite sides of the lower end of said housing and which extend to each corner of the lower end of said housing, said groups of nozzles leaving a transversely extending space therebetween through which ambient air may flow directly, whereby base drag is reduced.

2. In an aircraft having at least one gas turbine engine vertically mounted within an engine housing, the improvement comprising said housing having a lower end rectangular in section and said engine having a nozzle assembly comprising a plurality of elongated groups of adjacent nozzles disposed along opposite sides of the lower end of said housing and which extend to each corner of the lower end of said housing, said groups of nozzles leaving a transversely extending space therebetween, through which ambient air may flow directly, whereby base drag is reduced.

3. Power plant as claimed in claim 1 in which the engine is a by-pass engine.

4. Power plant as claimed in claim 3 in which the engine has separate nozzles for a flow of by-pass air and a flow of turbine exhaust gases.

5. Power plant as claimed in claim 3 in which said engine has a by-pass ratio of the engine is at least 5:1.

6. Power plant as claimed in claim 4 in which the flow of by-pass air is produced in a fan.

7. Power plant as claimed in claim 6 in which the fan is an axial flow fan driven by a radial flow turbine.

8. Power plant as claimed in claim 1 in which at least one of the said nozzles is provided with thrust deflector means which are movable into and out of a first position in which the respective nozzle is sealed, and into and out of a second position in which the flow through the respective nozzle is deflected horizontally.

References Cited

UNITED STATES PATENTS

| 2,526,409 | 10/1950 | Price | 60—226 |
| 2,930,544 | 3/1960 | Howell | 244—12 |
| 2,935,842 | 5/1960 | Highberg | 181—33.222 |
| 3,113,636 | 12/1963 | Brown | 60—263 |
| 3,137,131 | 6/1964 | Tyler | 60—226 |
| 3,141,299 | 7/1964 | Petrie | 60—226 |
| 3,143,184 | 8/1964 | Denning | 60—263 |
| 3,327,482 | 6/1967 | Pike | 60—271 |
| 3,373,566 | 3/1968 | Colville | 60—232 |
| 3,392,529 | 7/1968 | Pike | 60—263 |

DOUGLAS HART, Primary Examiner

U.S. Cl. X.R.

60—263, 271; 239—265.27; 244—53